Dec. 27, 1932.   F. W. BAKER   1,892,127
DEMOUNTABLE WHEEL RIM
Filed July 13, 1926   4 Sheets-Sheet 3

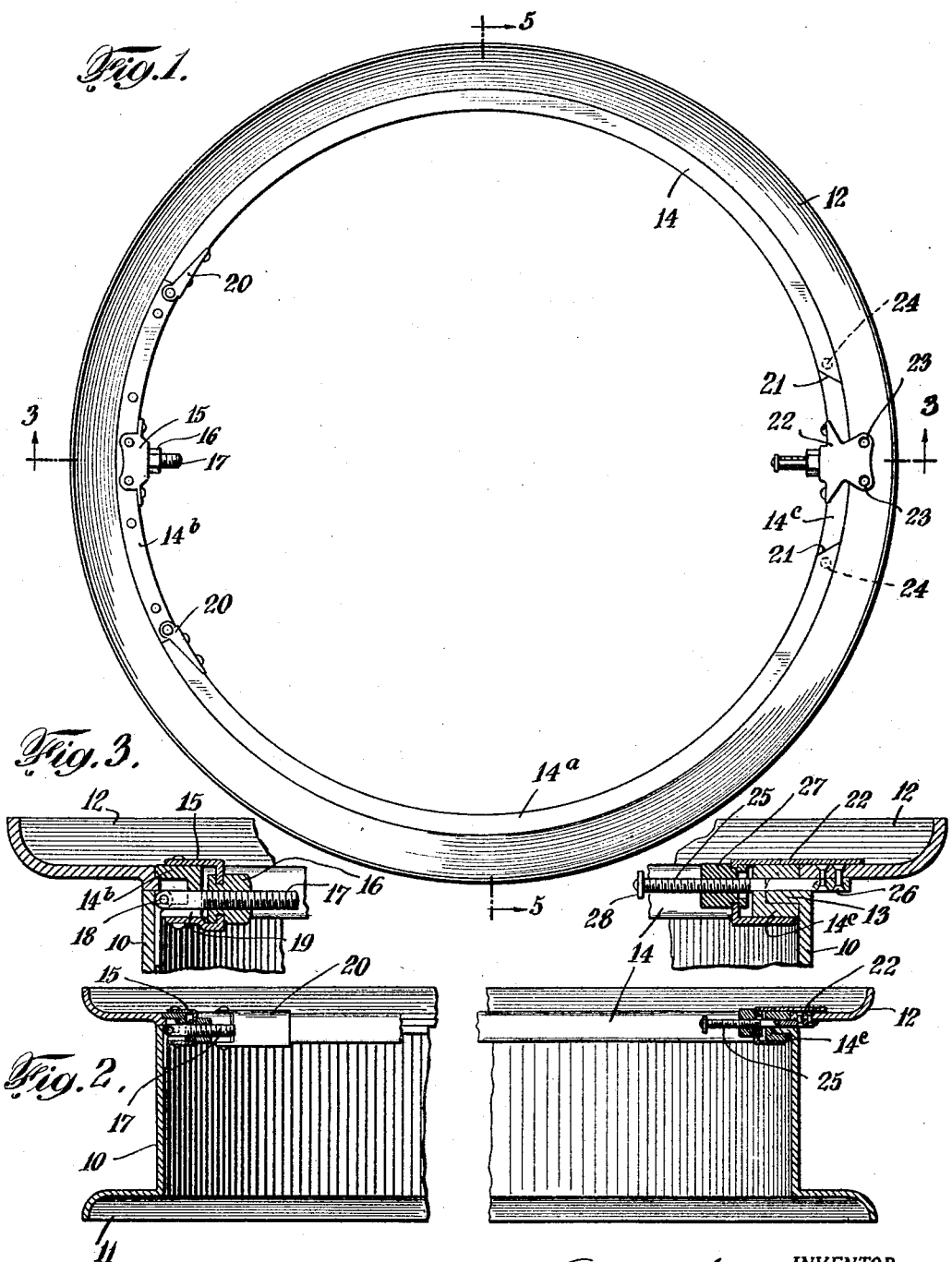

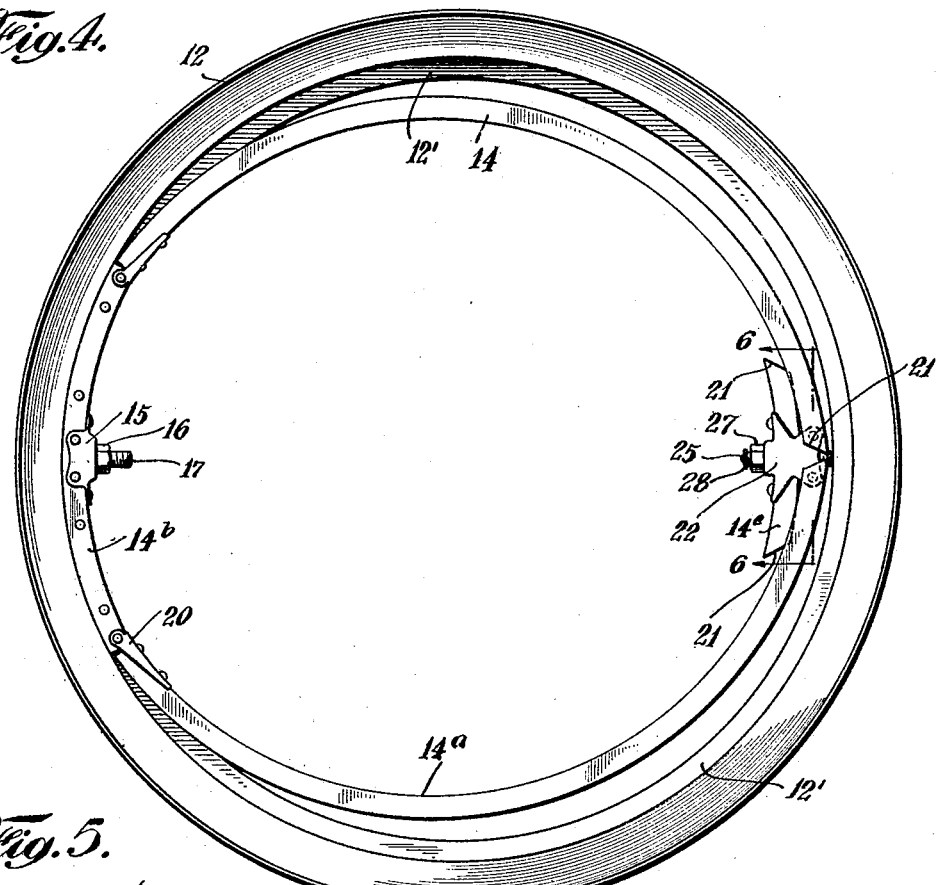
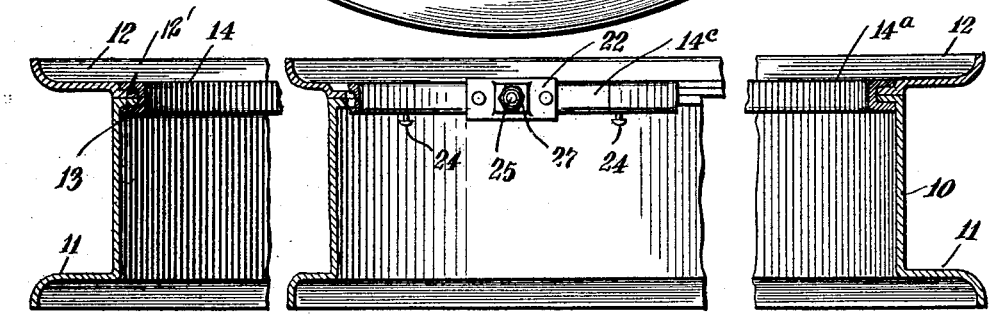
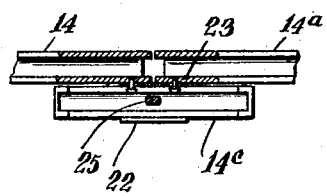

INVENTOR.
Frederick William Baker.
BY Ramsay Hoguet.
ATTORNEY

Dec. 27, 1932.   F. W. BAKER   1,892,127
DEMOUNTABLE WHEEL RIM
Filed July 13, 1926   4 Sheets-Sheet 4

INVENTOR.
Frederick William Baker.
BY Ramsay Hoguet,
ATTORNEY

Patented Dec. 27, 1932

1,892,127

UNITED STATES PATENT OFFICE

FREDERICK WILLIAM BAKER, OF OLDSWINFORD, STOURBRIDGE, ENGLAND, ASSIGNOR TO TRINITY WHEEL CORPORATION, OF NEW YORK, N. Y., A CORPORATION OF NEW YORK

DEMOUNTABLE WHEEL RIM

Application filed July 13, 1926. Serial No. 122,134.

My invention relates to improvements in demountable wheel rims such as are used chiefly on motor cars. The object of the invention is to produce a simple, strong, convenient structure having one of the main flanges detachable, and with means carried by the detachable flange and removable with it for securing said flange rigidly to the main rim, or tire bed. It is not new to have the wheel rim provided with a detachable tire and with some type of ring and fastening means to secure the tire and rim bed together, but usually structures of this kind have had separable parts so that when the flange is removed to remove the tire, the parts are likely to become injured or lost, or be not easily arranged. One of the main objects of my invention is to obviate this difficulty, and provide a fastening unit which essentially forms a part of the detachable flange of the rim so that the parts are always in position for ready adjustment. Another object of my invention is to produce a structure of this kind in which the main rim or tire bed is left entirely smooth when the detachable flange is taken off, to the end that the tire may be easily slipped off or on as desired, and further to provide a simple and easily actuated locking means removable as stated with the flange, but which will bind the meeting parts of the flange and rim so firmly that they are to all intents rigid. This idea of having a unitary fastening means forming a part of the removable flange can be carried out in many ways without affecting the invention, but I have shown and will describe a preferred way of accomplishing this result, and in my preferred embodiment of the invention it will be noticed that the wheel rim and one flange are continuous, and that the detachable flange is also continuous, so that the structure as a whole avoids the complications incidental to most rims of this character. My invention is also intended to produce a locking member preferably in the form of a ring which clamps together the meeting parts of the rim substantially throughout their entire length in a very secure manner, and in which design the locking members are displaceable radially and anchored by a screw device in the form of a coupling to one part of the rim in such a way that by releasing the said device the entire locking member is released.

Reference is to be had to the accompanying drawings forming a part of this specification, in which similar reference characters indicate corresponding parts in all the views.

Figure 1 is a side elevation of the rim embodying my invention.

Figure 2 is a broken cross section on the line 3—3 of Figure 1.

Figure 3 is a broken cross section similar to Figure 2 but on an enlarged scale to more clearly show the parts.

Figure 4 is a view similar to Figure 1 but with the locking means partly released.

Figure 5 is a broken cross section on the line 5—5 of Figure 1.

Figure 6 is a detail section on the line 6—6 of Figure 4.

Figure 7:
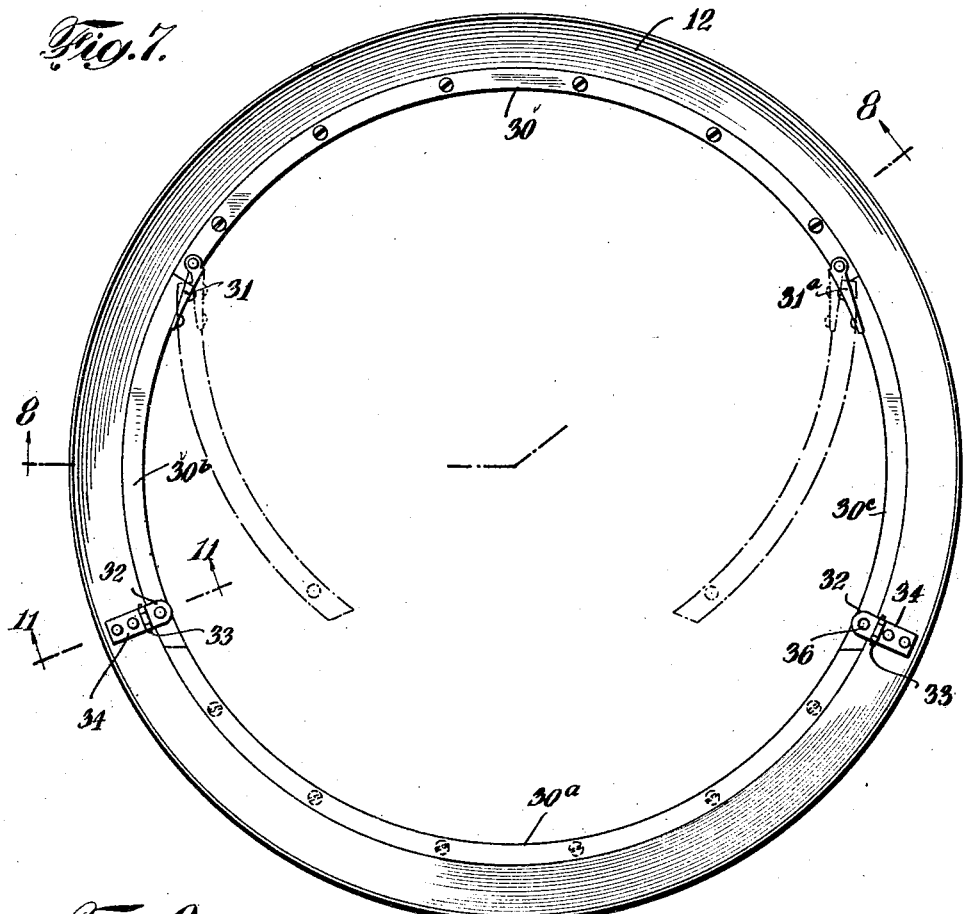
Figure 7 is a side elevation showing a modified form of locking means for the detachable flange.
Figure 8:
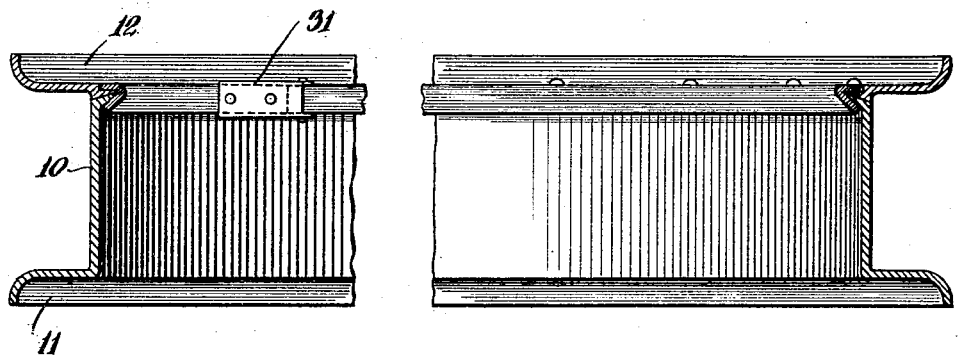
Figure 8 is a broken section on the line 8—8 of Figure 7.

In the drawings I have shown rather a conventional rim comprising a main body or rim section consisting of a tire bed 10 with a flange 11 rigid thereon, and another flange 12 detachable. The bed 10 has in its preferred form at the edge nearest the detachable flange 12, an inturned bead or lip 13 which is complementary to a part 12′ on the inner edge of the flange 12, so that when these parts meet, a smooth tire bed will result, and the members 10 and 12 can be conveniently fastened. This is not a novel idea, but the means of locking is the essential thing. The meeting parts 12′ and 13 are locked together preferably throughout their whole circumference by a channel ring made up of segments which are mounted in relation to each other so as to be readily freed from or attached to said meeting parts, and the channel ring and all its parts are carried by and are removable with one of the rim members preferably the flange. This ring, as shown in Figure 1, is made up of segments 14, 14ª, 14ᵇ and 14ᶜ, each of which has the channel formation so as to fit snugly over the meeting parts of the flange and rim. The member 14ᵇ is anchored to the flange 12 as shown in Figure 1, and has a generally U shaped clip 15 straddling it and engaging a nut 16 which is held against removal but so as to turn freely. The nut engages a bolt 17 which is hinged as shown at 18 (see Figure 3) to the inner part of the bed 10 near the free edge of the latter, and the member 14ᵇ is slotted near the bolt as shown at 19 in Figure 3 so as to permit of the certain movement of the part 14ᵇ and the bolt with relation to each other, to the end that when the member 14ᵇ is placed on over the lips 12' and 13, the bolt can be easily centered in the nut 16. The member 14ᵇ, therefore, is removably anchored to the bed 10 and this prevents it and the other parts of the channel ring from moving circumferentially.

To provide for the partial collapse and removal of the channel ring, the members 14 and 14ª are hinged to the ends of the part 14ᵇ as shown clearly in the drawing, and the hinges 20 are preferably U shaped in cross section so as to partly overlap the members 14 and 14ª and make a stronger hinge, but the type of hinge is not important. At their opposite ends the segments 14—14ª are inclined to meet opposite similarly inclined parts 21 of the section 14ᶜ, so that when this section is in place as in Figure 1, it will wedge like a key stone between the members 14 and 14ª and bind them firmly in place. The section 14ᶜ, with suitable means for operating it, therefore serves as the binding medium. This segment 14ᶜ is straddled by the clip 22, the sides of which overlap the member 14ᶜ and on one side the flange 12 also, and this overlapping side is provided with holes 23 so that when the segment 14ᶜ is displaced, the holes 23 may receive the studs 24 near the end parts of the segments 14—14ª and will thus be held approximately in position for easy adjustment to lock the flange.

The bolt 25 extends through the segment 14ᶜ and is flattened as shown in Figure 6 so that the section or segment 14ᶜ will not wobble on the bolt. The bolt is fastened at one end rigidly to the flange 12 as at 26 (see Figure 3 at the right hand), and it engages a nut 27 which is held to turn but not be displaced in the clip 22. The bolt 25 has preferably a collar 28 at its inner end to limit the outward movement of the nut 27 on the bolt.

When all the parts are in the position shown in Figure 1, it will be seen that the continuous channel ring formed by the parts 14, 14ª, 14ᵇ, and 14ᶜ, clamps the meeting complementary portions 12' and 13 of the flange 12 and bed 10 throughout the whole inner circumference of the rim, and thus a very strong fastening is provided. If the flange is to be removed, however, the nut 27 is turned so as to move the nut clip 22 and segment 14ᶜ inward, as in Figure 4, and the members 14—14ª being long and springy, can be moved to one side as shown in Figure 6 so that the pins 24 will enter the holes 23 of the segment 14ᶜ, and thus the latter will be held in place. The nut 16 can then be turned so as to move the part 14ᵇ inward radially on the bolt 17, and the whole flange 12 with the fastening means as a unit, removed without danger of any of the parts becoming separated, injured or lost. It will be seen that when this is done the tire bed 10 will on one side be left free and without any obstruction so that the tire can be readily pulled off.

It will also be seen that by releasing the locking screw 25 or rather its nut 27, so as to force in the member 14ᶜ, and then turning the nut 16, the member 14ᵇ and the entire locking ring can be radially displaced so as to release the flange 12' and permit it to be pulled from the rim.

Figure 9:
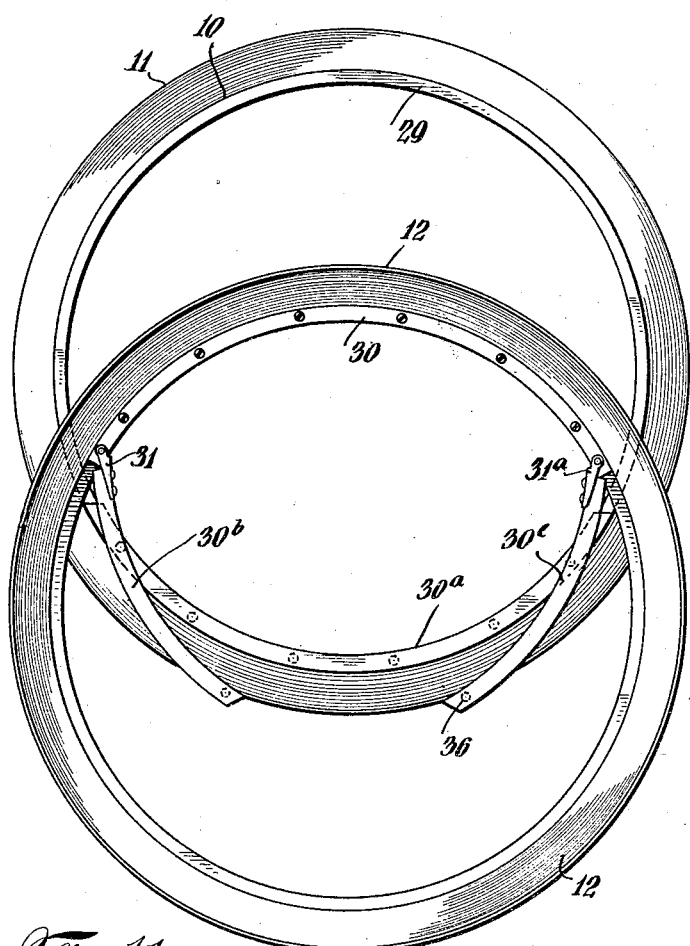
Figure 9 is a side elevation showing a modified structure but with the flange mounted with relation to the main rim.
Figure 10:
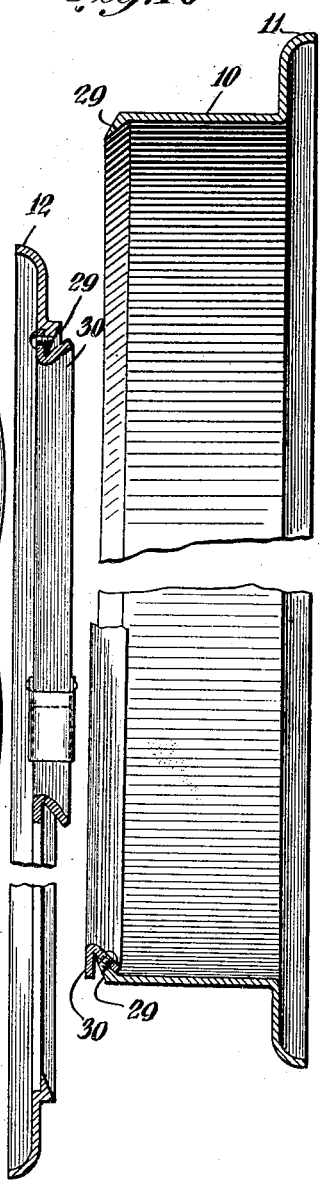
Figure 10 is a broken cross section of Figure 9.
Figure 11:
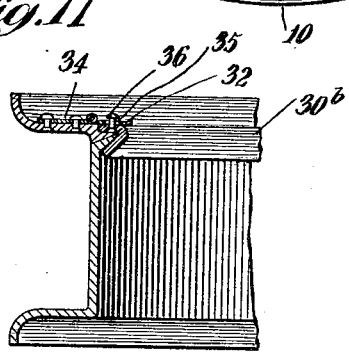
Figure 11 is a detail cross secton on the line 11—11 of Figure 7.

In the remaining figures I have shown another means of carrying out the idea of this invention, without, however, limiting the fastening to any type shown. As here illustrated the tire bed 10 has as before an edge lip 29, to abut with a corresponding lip on the flange 12, and the channel ring which serves to fasten the flange and tire bed together is somewhat modified. As before, the ring clamps the complementary meeting parts 29 of the tire bed and flange, but the channel ring in this case has a section 30 rigid on the flange 12, a segment 30ª rigid on the lip of the bed 10, and swinging sections 30ᵇ and 30ᶜ which are hinged to the part 30, and when closed, complete the ring. The members 30ᵇ and 30ᶜ are connected to the part 30 by hinges 31 and 31ª, and near their free ends the segments have each a headed pin 36 adapted to engage a slot 35 in the clip 32 which is hinged as shown at 33 to a butt 34 fastened rigidly on the flange. With this type of fastening it will be seen that the locking means is still carried by the removable flange 12. When the tire is to be removed, the clips 32 are released from the pins 36 and the segments 30ᵇ—30ᶜ swung inward, after which the flange 12 may be moved by sliding it transversely as in Figure 9 with relation to the bed, and then pulling it off in an axial direction leaving the bed 10 free for the removal of the tire.

In the specification I have referred to the body portion 10 as a bed and as a tire bed, but in certain types of wheel rims, as for example the type shown in my application for Letters Patent of the United States Serial No. 85,262, filed February 1st, 1926, a supplemental band or bed is used between the tire flanges outside the main bed and spaced therefrom, but it will be readily seen that my present invention lends itself to this type of wheel rim as well as to the particular type shown and described.

I claim:—

1. A wheel rim having axially separable parts, a locking ring for fastening said parts together and including a plurality of sectors, one of the sectors being rigidly secured to one of said parts and the other sectors movable into clamping position for holding the axially separable parts together, and a coupler carried directly upon one of the separable parts, said coupler carrying a section of the locking ring and adapted to maintain the sectors in interlocked engagement with each other when the ring is in position for fastening the parts together.

2. A wheel rim having axially separable parts, a locking ring for fastening said parts together and including a plurality of sectors, one of the sectors carried directly by one of said separable parts and the other sectors movable into clamping position for holding the axially separable parts together, a coupler carried directly upon one of the separable parts and engageable with a sector of the locking ring to maintain the sectors in interlocked engagement with each other when the ring is in position for fastening the parts together, and means associated with one of the sectors for radially displacing it relative to the part carrying the same and permitting operation of the sectors for separation of the parts of the rim from each other.

3. A wheel rim having a bed and a detachable flange, said bed and flange each having an inturned annular flange, a sectional locking ring U-shape in cross section adapted to embrace said two inturned flanges, one of the sections of said locking ring being carried directly by said detachable flange, said last mentioned section having a section of the locking ring pivoted to each of its ends, another of said sections being free and adapted to engage the pivoted sections to hold the same in straddling position over the inturned flanges and means for clamping said free section to the detachable flange.

4. A wheel rim having axially separable parts, a locking ring for fastening the parts together and including a plurality of sectors, one of said sectors being carried directly by one of said separable parts and the other sectors being movable into clamping position for holding the axially separable parts together, certain of said sectors being pivoted to the sector carried by said separable part, said pivoted sectors presenting inclined edges, another of said sectors presenting reversely inclined edges complimentary to said first mentioned inclined edges and means for clamping said last mentioned sectors over said parts to maintain all of said sectors in locking position.

5. A tire carrying rim comprising a detachable flange section and a rim section, a flange clamping element having opposed swinging segmental jaws for retaining the detachable flange section on the rim section, and an intermediate flange attaching section, coupling means carried directly by the flange section for detachably connecting said flange attaching section to said flange section, said flange attaching section adapted for locking the swinging jaws in clamping position.

6. In combination, a tire carrying rim section, a detachable tire flange section, a ring element carried directly by said flange section for securely clamping said rim section and detachable flange section substantially throughout their entire length, and having hinged sections radially displaceable, and couplers on said detachable flange section for detachably connecting the ring element in operative position and radially displacing said ring element during detaching operation.

7. A tire rim comprising a rim section and a detachable flange section, each of said sections having abutting flange portions, locking means comprising a ring segment fixedly secured to said detachable flange section and other segments hinged to the ends of said first segment, a coupler comprising a stud carried by said detachable flange section, another ring segment associated with said stud, and means co-acting with said stud for holding said last mentioned segment in position whereby said locking means securely holds said abutting flange portions together.

In testimony whereof, I have signed my name to this specification this 8th day of July, 1926.

FREDERICK WILLIAM BAKER.